US006896716B1

United States Patent
Jones, Jr.

(10) Patent No.: US 6,896,716 B1
(45) Date of Patent: May 24, 2005

(54) PROCESS FOR PRODUCING ULTRA-PURE PLUTONIUM-238

(75) Inventor: John E. Jones, Jr., Oak Ridge, TN (US)

(73) Assignee: Haselwood Enterprises, Inc., Oak Ridge, TN (US)

( * ) Notice: Subject to any disclaimer, the term of this patent is extended or adjusted under 35 U.S.C. 154(b) by 55 days.

(21) Appl. No.: 10/315,895

(22) Filed: Dec. 10, 2002

(51) Int. Cl.$^7$ ............................................. C22B 60/04
(52) U.S. Cl. ........................ 75/396; 376/170; 376/182
(58) Field of Search ........................ 75/396; 376/170, 376/182, 189

(56) References Cited

U.S. PATENT DOCUMENTS

| | | | | |
|---|---|---|---|---|
| 2,887,358 A | * | 5/1959 | Higgins et al. | 376/170 |
| 2,975,113 A | * | 3/1961 | Maret | 376/180 |
| 3,147,109 A | | 9/1964 | Knighton et al. | |
| 3,161,462 A | | 12/1964 | Seaborg | |
| 3,360,477 A | * | 12/1967 | Acree et al. | 252/644 |

OTHER PUBLICATIONS

Ihle, H. et al; Isotopic Composition of Plutonium–238 from Americium–241 and Reactor Cross–Sections of Actinide Nuclides. 1972. J. Inorg. Nucl. Chem. 1972, vol. 34, pp. 2427–2437.*

Watanabe, K. et al. Separation of Plutonium–238 and Plutonium–242 from Irradiated Amercium–241. Journal of Nuclear Science. and Technology, 10(1), 62–63, 1973.*

D. C. Stewart, et al., Data Relating to the Production of Transcurium Elements in High Neutron Fluxes, ANL 6932, Sep. 1, 1964 pp 5–9.

Carolyn A. Mangeng, et al., Beneficial Uses of 241 Am, LA–10075–MS, May, 1984, pp 1–8.

A. F. Rupp, et al., Radioisotopes Production for Power Reactors, ORNL—3792, May, 1965 pp., 5, 10, 13, 32, 34, and 35.

W. E. Bickford, Large–Scale Production of Pu–238 to 'Denature' Weapons–Grade Plutonium (U), WSRC–TR–96–0382, Dec. 2, 1996, pp., 01–22.

W.E. Bickford, Savannah River Site—Personal Communication.

* cited by examiner

*Primary Examiner*—Ngoclan T. Mai
(74) *Attorney, Agent, or Firm*—Robert M. Poteat, P.C.; Robert M. Poteat

(57) ABSTRACT

A method for producing ultra-pure Pu-238 is provided. The method comprises the steps of short-term irradiating Am-241 targets with a high, thermal neutron flux greater than $6.5\times10^{14}$ neutrons $cm^{-2} s^{-1}$ and more preferably greater than $1\times10^{15}$ neutrons $cm^{-2} s^{-1}$ for a predetermined period of time preferably from 20 days to 30 days and more preferably approximately 25 days to convert a substantial fraction of the Am-241 to Cm-242, e.g., approximately 0.555 g of Cm-242 per g of Am-241 charged, thereafter promptly chemically separating the produced Cm-242, preferably within 10 days to 20 days of the irradiation cycle of the Am-241 targets and more preferably within about 15 days of the irradiation cycle of the Am-241 targets, and recovering the ultra-pure Pu-238 decay product of the separated Cm-242.

9 Claims, 1 Drawing Sheet

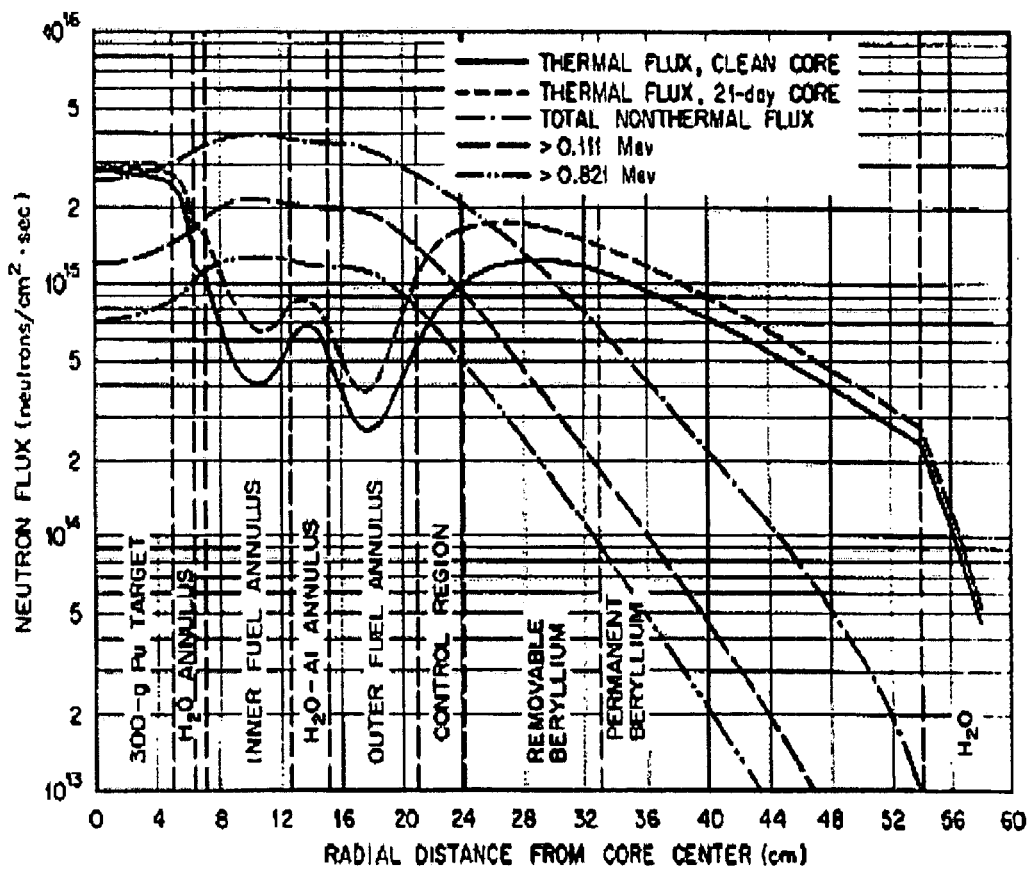
Typical radial neutron flux distributions at core horizontal midplane with reactor operating at 100 MW

PROCESS FOR PRODUCING ULTRA-PURE PLUTONIUM-238

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention pertains to a process for producing transuranic isotopes and more particularly to a process for producing ultra-pure Plutonium-238 (Pu-238). The ultra-pure Pu-238 is especially useful as a heat source in Radio-isotope Thermal Generators (RTGs) in the National Aeronautics and Space Administration (NASA) space program and may also be used in Department of Defense (DOD) space applications.

2. Description of the Related Art

Radioactive isotopes are well known in the art and various methods have heretofore been used to product isotopes of interest. One isotope of interest is Pu-238. It is well known to those skilled in the art that Pu-238 may be produced using either NP-237 or Am-241 targets.

In the former, irradiation of Np-237 targets in a high thermal neutron flux produces Np-238, which decays via β decay (2.12 days) into Pu-238. This is shown as:

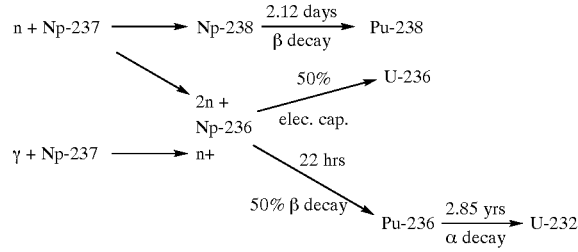

This has been the method of choice at the Department of Energy's Savannah River Site (SRS) production reactors. However, there are several shortcomings with this method of production. First, the production efficiency is quite limited, i.e., to approximately 13% efficiency. This is seen from the fact that the Pu-238 produced in the target after only 2.12 day's half-life decay, itself becomes a target for production of higher isotopes of plutonium, thus reducing the Pu-238 purity by producing Pu-239 and Pu-240. Second, this process produce a hazardous Pu-236 by-product. As noted on the decay chain, above, there is a η→2η or γ→η reaction that results in the production of Uranium-236 (U-236) and Pu-236. These reactions increase with exposure to fast neutron flux. Pu-236 decays to U-232, which has a hazardous gamma-ray energy emitting daughter product. Even a few parts per million U-232 increase the radiation exposure hazard to personnel dramatically. Lastly, Np-237 must be chemically purified before target fabrication. This is seen from the fact that Np-237 decays to Protactinium-233 (Pa-233), which in turn has a strong gamma-ray emission with its beta decay to U-233 (half-life 27 days). Therefore, the Np-237 was stored in solution at SRS and chemically processed immediately before fabricating targets. Solution storage of Np-237 may not be practical at an alternate production site.

In the alternate production method, Am-241 targets are irradiated with high-energy neutrons to produce first Am-242 which decays via β decay (16 hours) to Cm-242, which in turn decays via α decay (163 days) to Pu-238. This is shown as:

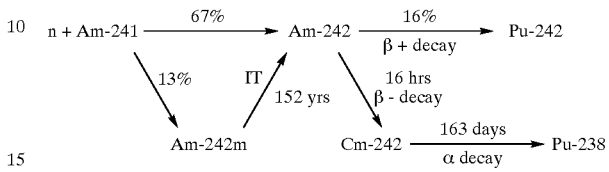

Production of Pu-238 via this process resulted in extremely low production efficiency, and more importantly, low Pu-238 purity, i.e., only about 72% pure Pu-238, having a mixture of radioisotopes of Pu-242 and other Pu isotopes. This extremely low yield of Pu-238, as well as the mixture of unwanted radioisotopes makes this production route of limited use in the production of Pu-238 for applications such as a heat source in Radioisotope Thermal Generators (RTGs) in the NASA's space program. There is a need to find an efficient process for producing Pu-238 wherein the produced Pu-238 is in ultra-pure form, i.e., 95% or higher.

It is an object of this invention to provide a highly efficient and low-cost process for producing Pu-238. Another object is to provide a method for producing ultra-pure Pu-238.

BRIEF SUMMARY OF THE INVENTION

In accordance with the above and other objects of the invention, it has been found that ultra-pure Pu-238 could be produced efficiently by a short term, high-flux irradiation of Am-241 targets followed by prompt chemical separation of the Cm-242 produced. The separated Cm-242 decays to an ultra-pure Pu-238 product. In one embodiment of the invention, Am-241 targets are irradiated in a high thermal neutron flux for a predetermined time and neutron flux sufficient to convert a substantial fraction of the Am-241 to Cm-242. For this, the high thermal neutron flux is preferably greater than $6.5 \times 10^{14}$ neutrons $cm^{-2}s^{-1}$ and more preferably greater than $1.0 \times 10^{15}$ neutrons $cm^{-2}$ $s^{-1}$, and the predetermined period of time is preferably from 20 days to 30 days, and more preferably approximately 25 days. This neutron flux and period of time is sufficient to convert a substantial fraction of the Am-241 to Cm-242, e.g., sufficient to produce 0.444 to 0.666 g of Cm-242 per g of Am-241 irradiated and more preferably 0.555 g of Cm-242 per g of Am-241 irradiated. The produced Cm-242 is then chemically separated promptly with the chemical separation step being made preferably within 10 days to 20 days and more preferably about 15 days of the irradiation cycle of the Am-241 targets to separate and recover up to 90% of the Cm-242 before it decays to Pu-238 with a 163-day half-life. The separated Cm-242 subsequently decays to an ultra-pure Pu-238. The resulting production efficiency of ultra-pure Pu-238 ranges from 39% to 60% and for the nominal conditions of $1.0 \times 10^{15}$ neutrons $cm^{-1}$ $s^{-1}$ neutron flux, 25 days irradiation, and 15 days elapsed time before separation of the Cm-242 the production efficiency is 49%.

BRIEF DESCRIPTION OF THE SEVERAL VIEWS OF THE DRAWINGS

The sole figure depicts a typical radial neutron flux distribution at core horizontal mid-plane of the High Flux Isotope Reactor (HFIR) at 100 megawatts (MW).

DETAILED DESCRIPTION OF THE INVENTION

It has been found that a short-term, high-flux irradiation with thermal neutrons of Am-241 targets, followed by prompt chemical separation of the produced Cm-242, which decays to the desired Pu-238, will produce ultra-pure Pu-238. The combination of short-term, high-flux irradiation with thermal neutrons of Am-241 targets and prompt chemical separation of the produced Cm-242, which decays to the Pu-238, produces Pu-238 purity of about 95% and achieves production efficiencies and reduced cost (i.e., by as much as a factor of 2) dramatically better than with the prior art method heretofore employed at DOE's Savannah River Facility using long-term, low-flux irradiation of Np-237 or Am-241 targets.

More particularly and as described above, the method of the invention provides for a highly efficient method for producing ultra-pure Pu-238 by first irradiating Am-241 targets in a high thermal neutron flux, preferably greater than $6.5\times10^{14}$ neutrons $cm^{-2}$ $s^{-1}$, and more preferably greater than $1.0\times10^{15}$ neutrons $cm^{-2}$ $s^{-1}$ for a predetermined period of time, preferably 20 days to 30 days and more preferably approximately 25 days, followed by the prompt chemical separation of the produced Cm-242, preferably within 10 days to 20 days of the irradiation cycle of the Am-241 targets and more preferably within approximately about 15 days of the irradiation cycle of the Am-241 targets to separate and recover up to 90% of the Cm-242 produced during irradiation before it decays to Pu-238. The subsequent decay of Cm-242 to Pu-238 following separation yields an ultra-pure Pu-238, i.e., 95% or higher purity.

The starting material for this invention is an Am-241 target. Am-241 is a decay product of Pu-241 with a 14.4-year half-life. Weapons-grade plutonium contains 0.5% Pu-241. Fuel- and power-grade plutonium contains 1.5% to 12% Pu-241. It is estimated that more than 100 kilograms of Am-241 have been separated from weapons-grade plutonium in the past, primarily at Rocky Flats. Modest quantities of Am-241 remain in inventory currently. However, 40 to 60 kg of pure Am-241 may be recovered from approximately 20,000 Am-Be sources that are being returned to DOE. Am-241-bearing salts at Rocky Flats would yield another 40 to 60 kg of pure Am-241 if it were separated. The DOE stockpile of surplus weapons-grade plutonium is estimated to contain at least 150 kg of additional Am-241, and finally, U.S. commercial spent nuclear fuel is estimated to contain an additional 20,000 kg of Am-241 through 1993. See *Spent Nuclear Fuel Discharges from U.S. Reactors* 1993, SR/CNEAF/95-01, which is incorporated herein by reference.

The extraction and separation of Am-241 from weapons-grade plutonium or commercial spent nuclear fuel, when required, may be carried out by well-known and established techniques previously used at several of the DOE facilities, such as the Radiochemical Engineering Development Center (REDC) located at the Oak Ridge National Laboratory, Oak Ridge, Tenn. For a more detailed description of the REDC facility see www.ornl.gov/divisions/nuclear science technology/redc, the information therein is hereby incorporated by reference. Based on existing inventories and the anticipated recovery of pure Am-241 from sealed sources, the extraction and separation of additional Am-241 from weapons-grade plutonium or other sources may not be required for 10 years or more.

For target fabrication and irradiation, the purified Am-241 is converted to a stable oxide and may, for example, be compacted into a target capsule prior to loading into a nuclear reactor for irradiation. While the target capsule may vary widely in design and dimensions, a suitable design may be one in which the target is approximately 1.8 inches in diameter with an active region of 18 inches long and contains approximately 75 g of Am-241 per target assembly.

The Am-241 targets are then loaded in the nuclear reactor for irradiation. In accordance with the method of this invention, the Am-241 targets are irradiated in a high thermal neutron flux, preferably greater than $6.5\times10^{14}$ neutrons $cm^{-2}$ $s^{-1}$, and more preferably greater than $1.0\times10^{15}$ neutrons $cm^{-2}$ $s^1$ for a predetermined period of time.

One suitable high neutron flux reactor is the High Flux Isotopes Reactor (HFIR) located at the Oak Ridge National Laboratory, a facility managed and operated for the Department of Energy by UT-Battelle L.L.C. as a User Facility. Of the major irradiation facilities in the HFIR there are eight Removable Beryllium Facilities that have an average neutron flux of at least $1.0\times10^{15}$ neutrons $cm^{-2}$ $s^{-1}$. The HFIR radial neutron flux distribution is shown in the figure. (See FIG. 6 contained in "Information Brochure for High-Flux Isotope Reactor," July 1991, available to the public from UT-Battelle's Public Information Office, Oak Ridge, Tenn., and hereby incorporated herein by reference").

For purposes of illustration, up to eight target assemblies comprised of the Am-241 oxide may be loaded into the Removable Beryllium Facilities in HFIR, allowing up to 600 grams of Am-241 to be irradiated for the 25-day irradiation cycle. As noted therein, the average thermal neutron flux at the Removable Beryllium Facilities is on the order of $1.0\times10^{15}$ neutrons $cm^{-2}$ $s^{-1}$. Typical radial neutron flux distributions at core horizontal mid-plane of HFIR operating at 100 MW are shown in the figure. It should be noted that the neutron flux values shown, for purposes of the following calculations are reduced to 85 percent to account for the current power level of 85 MW. For the preferred irradiation period of 25 days in HFIR at a neutron flux of $1.0\times10^{15}$ neutrons $cm^{-2}$ $s^{-1}$ the production rate per 25-day HFIR cycle is 0.555 g Cm-242 per g Am-241 charged. This is based on conversion rates established at the Savannah River Site for the conversion rate for production of Pu-238 using an Am-241 target and is described in greater detail in "Large-Scale Production of Pu-238 to 'Denature' Weapons-grade Plutonium (U), WSRC-TR-96-0382, Rev. 1, Dec. 2, 1996, which is incorporated herein by reference.

Using the conversion rate derived above, up to 600 grams of Am-241 targets irradiated 25 days in HFIR produces: (600 g Am-241)(0.555 g Cm-242 [Pu-238] per g Am-241 or 333 g Cm-242 (Pu-238) per 25-day cycle. However, part of the Cm-242 decays before it is separated, so only about 296 g of Cm-242 (89% of 333 g) is separated and decay to an ultra-pure Pu-238. Recognizing that the HFIR completes approximately 10 25-day fuel cycles per year, a total of 2960 g of ultra-pure Pu-238 could be produced per year if all eight of the Removable Beryllium Facilities were used.

Additionally, HFIR also contains sixteen small Vertical Experimental Facilities (VXFs), each of which has a high flux, but less than the Removable Beryllium Facilities, of $6.5\times10^{14}$ neutrons $cm^{-2}$ $s^{-1}$ at the current 85-MW power level. These facilities could also be used to achieve the short-term, high neutron flux of the Am-241 targets in accordance with the method of this invention, but at a slightly lower production efficiency.

It is important, in the practice of this invention, that the Cm-242 be separated promptly and for this step a suitable reprocessing facility may, for example, be the Radiochemical Engineering Development Center (REDC) located adjacent to the HFIR at the Oak Ridge National Laboratory, Oak Ridge, Tenn., as described above. There, chemical separation of the produced Cm-242, in accordance with this invention, may be accomplished, for example, by chemical separation techniques in routine use at the REDC for chemical separation and purification of heavy isotopes. The remaining Am-241 could also be separated for recycle into future irradiation targets. Preferably, the chemical separation of the produced Cm-242 is carried out within 10 days to 20 days of the irradiation cycle of the Am-241 targets, and more preferably within about 15 days of the irradiation cycle of the Am-241 targets.

Assuming all eight of the Removable Beryllium Facilities were used to irradiate 600 g of Am-241 for one 25-day fuel cycle of the HFIR, the maximum amount of Cm-242 that decays before chemical separation may be calculated as follows: first, as it is produced, the Cm-242 concurrently decays to Pu-238 with a 163-day half-life ($T_{cm}^{1/2}$) both during the 25-day production cycle and also during the 15-day delay before chemical separation. As noted in the decay scheme for Pu-238 production using Am-241 targets, Am-242 (the parent of Cm-242) is produced, but it only has a half-life of 16 hours, which can for purposes of this calculation be conservatively ignored. The fraction of Cm-242 remaining ($R_{(t)}$) after the irradiation step and a time (t) elapses before the chemical separation occurs is:

$$R_{(t)} = \frac{\tau_{cm}}{t_0}(1 - e^{-\lambda_{cm} t_0})(e^{-\lambda_{cm} t}) \text{ where}$$

$$\tau_{cm} = \frac{T_{cm}^{\frac{1}{2}}}{0.693} = \frac{1}{\lambda_{cm}}$$

It may be seen from the above equation that only 11 percent will decay before chemical separation, leaving 89 percent of the Cm-242 to be recovered as an ultra-pure stream. From the total of 333 grams of Cm-242 created during the production cycle, 0.89×333 g=296 g will be recovered, which will decay into an ultra-pure Pu-238, i.e., about 95 percent.

The Cm-242 should be aged (stored) for a period of time sufficient to allow all of the Cm-242 to decay to Pu-238. A suitable aging period of time is up to ten half-lives (about 4.5 years). Thereafter, the ultra-pure Pu-238 may be recovered and processed by routine methods well known in the art.

Advantageously, the method of this invention provides an extremely high purity Pu-238 that may be used directly or, for example, blended with lower-purity Pu-238 to increase the production of the nominal 85 percent purity material needed for RTGs. Within the DOE complex there are, for example, existing quantities of low-purity Pu-238 (65 to 80% purity), which currently are expected to be processed as waste (since these stockpiles do not meet the minimum Pu-238 purity of 85%}. Blending 95%-purity Pu-238 with existing 75%-purity Pu-238 would result in twice as much Pu-238 at the 85% goal. Further, the ultra-pure Pu-238 could, in another use, be blended with Pu-238 previously purchased from Russia to reduce the Pu-236 concentration and make the Russian material less hazardous for workers. Additionally, the ultra-pure Pu-238 could be used directly in RTGs for applications involving manned space flights or very-long-duration flights.

It will be apparent to those skilled in the art to which this invention pertains that various modifications may be made without departing from the principles of the invention as disclosed herein, and thus it is not intended that the invention should be limited other than by the scope of the appended claims.

What is claimed is:

1. A method for producing ultra-pure Pu-238 comprising the steps of:

a) irradiating Am-241 at a high thermal neutron flux for a predetermined time and neutron flux sufficient to produce a value within the range of 0.333 to 0.666 g Cm-242 per g of Am-241 charged;

b) promptly chemically separating the produced Cm-242; and c) thereafter recovering the ultra-pure Pu-238 decay product.

2. The method of claim 1 wherein said step of irradiating said Am-241 is carried out at a thermal flux of at least $6.5 \times 10^{14}$ neutrons cm$^{-2}$ s$^{-1}$ and said time is from 20 days to 30 days.

3. The method of claim 2 wherein said step of irradiating said Am-241 is carried out at a thermal neutron flux of about $1.0 \times 10^{15}$ neutrons cm$^{-2}$ s$^{-1}$ and said time is about 25 days.

4. The method of claim 1 wherein said prompt chemical separating step is carried out within 10 days to 20 days of said irradiation cycle.

5. The method of claim 4 wherein said prompt chemical step is carried out in approximately 15 days of said eaten irradiation cycle.

6. The method of claim 1 wherein said recovered Pu-238 has a purity level above about 95 percent Pu-238.

7. A method for producing ultra-pure Pu-238 comprising the steps of:

a) irradiating Am-241 at a high thermal neutron flux of about $1.0 \times 10^{15}$ neutrons cm$^{-2}$ s$^{-1}$ and a time of about 25 days to produce a value of about 0.555 g of Cm-242 per g Am-241 charged;

b) chemically separating the produced Cm-242 within approximately 15 days of said irradiation cycle; and c) thereafter recovering the ultra-pure Pu-238 decay product of Cm-242.

8. The method of claim 7 wherein said recovered Pu-238 has a purity level of above about 95 percent of Pu-238.

9. The method of claim 7 wherein the production efficiency of the said Pu-238 is approximately 0.48 g Pu-238 per g Am-241.

* * * * *